United States Patent
Ricketts et al.

(10) Patent No.: US 8,939,828 B2
(45) Date of Patent: Jan. 27, 2015

(54) BIOMASS CONVEYING AND DISTRIBUTING SYSTEM FOR A HARVESTER

(75) Inventors: Jonathan E. Ricketts, Ephrata, PA (US); John J. Borsdorf, Leola, PA (US); James Minnihan, Moline, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/498,353

(22) PCT Filed: Sep. 27, 2010

(86) PCT No.: PCT/US2010/050343
§ 371 (c)(1),
(2), (4) Date: Apr. 25, 2012

(87) PCT Pub. No.: WO2011/041250
PCT Pub. Date: Apr. 7, 2011

(65) Prior Publication Data
US 2012/0208607 A1    Aug. 16, 2012

Related U.S. Application Data

(60) Provisional application No. 61/277,758, filed on Sep. 29, 2009.

(51) Int. Cl.
| A01F 11/06 | (2006.01) |
| A23N 5/00 | (2006.01) |
| B02B 3/00 | (2006.01) |
| A01D 90/02 | (2006.01) |
| A01D 45/02 | (2006.01) |

(52) U.S. Cl.
CPC .............. *A01D 90/02* (2013.01); *A01D 45/02* (2013.01); *A01F 11/06* (2013.01)
USPC .......................................................... 460/25

(58) Field of Classification Search
USPC ........ 460/25, 26, 100, 110, 99, 114; 209/136, 209/137, 509; 56/13.5, 16.5
See application file for complete search history.

(56) References Cited

U.S. PATENT DOCUMENTS

| 2,935,193 | A | * | 5/1960 | Karlsson | 209/136 |
| 3,071,246 | A | * | 1/1963 | Schimke | 209/27 |
| 3,298,162 | A | * | 1/1967 | Medd | 56/13.9 |
| 3,630,009 | A | * | 12/1971 | Ashton | 56/11.9 |
| 3,680,291 | A | * | 8/1972 | Soteropulos | 56/14.3 |
| 3,721,075 | A | * | 3/1973 | Weiberg | 56/13.5 |

(Continued)

FOREIGN PATENT DOCUMENTS

EP    0109324 A1    5/1984

*Primary Examiner* — Árpád Fábián-Kovács
(74) *Attorney, Agent, or Firm* — Seyed V. Sharifi T.; Patrick M. Sheldrake (57) ABSTRACT

A biomass conveying and distributing system for separating and distributing lighter biomass residue from heavier or denser biomass, utilizing available air flow from the cleaning system of the harvester. The harvester will discharge a flow of heavier or denser biomass with an airborne flow of lighter biomass residue. The system includes a conveyor for receiving and conveying the heavier or denser biomass, and residue distributing apparatus disposed above the conveyor in a path of at least a portion of the airborne flow of lighter residue, including at least one deflector configured and operable for redirecting the airborne flow sidewardly away from the conveyor, above a passage through which the conveyor passes carrying the heavier biomass away from the harvester.

19 Claims, 8 Drawing Sheets

(56) References Cited

U.S. PATENT DOCUMENTS

| | | | | |
|---|---|---|---|---|
| 3,772,860 A | * | 11/1973 | Weiberg | 56/13.5 |
| 3,952,889 A | * | 4/1976 | Wanker et al. | 406/39 |
| 3,962,072 A | * | 6/1976 | Ramacher et al. | 209/140 |
| 4,121,778 A | * | 10/1978 | Quick | 241/79 |
| 4,147,017 A | * | 4/1979 | Cortopassi et al. | 56/16.5 |
| 4,178,743 A | * | 12/1979 | Persoons et al. | 56/12.9 |
| 4,287,707 A | * | 9/1981 | Persoons et al. | 56/12.8 |
| 4,642,977 A | * | 2/1987 | Ramacher | 56/328.1 |
| 4,943,260 A | * | 7/1990 | Fossum | 460/96 |
| 5,193,331 A | * | 3/1993 | Quandt | 56/12.8 |
| 5,421,147 A | * | 6/1995 | Holden et al. | 56/328.1 |
| 5,930,987 A | * | 8/1999 | Urich et al. | 56/14.5 |
| 5,941,768 A | * | 8/1999 | Flamme | 460/114 |
| 6,033,305 A | | 3/2000 | Perez et al. | |
| 6,547,169 B1 | | 4/2003 | Matousek et al. | |
| 7,524,242 B2 | * | 4/2009 | Stukenholtz et al. | 460/115 |
| 7,566,266 B1 | * | 7/2009 | Ricketts et al. | 460/101 |
| 7,651,391 B2 | * | 1/2010 | Weichholdt et al. | 460/111 |
| 7,731,578 B2 | * | 6/2010 | Birrell et al. | 460/100 |
| 7,811,161 B1 | * | 10/2010 | Ricketts et al. | 460/26 |
| 7,837,542 B1 | * | 11/2010 | Ricketts et al. | 460/99 |
| 7,862,411 B1 | * | 1/2011 | Ricketts et al. | 460/23 |
| 7,927,198 B2 | * | 4/2011 | Redekop et al. | 460/99 |
| 7,993,188 B2 | * | 8/2011 | Ritter | 460/111 |
| 8,113,353 B2 | * | 2/2012 | Redekop et al. | 209/137 |
| 8,286,798 B2 | * | 10/2012 | Ricketts et al. | 209/138 |
| 2006/0183519 A1 | | 8/2006 | Benes | |
| 2009/0095662 A1 | * | 4/2009 | Redekop et al. | 209/509 |
| 2009/0104952 A1 | * | 4/2009 | Redekop et al. | 460/80 |
| 2009/0124309 A1 | * | 5/2009 | Redekop et al. | 460/100 |
| 2010/0193411 A1 | * | 8/2010 | Redekop et al. | 209/509 |

* cited by examiner

BIOMASS CONVEYING AND DISTRIBUTING SYSTEM FOR A HARVESTER

This application claims the benefit of U.S. Provisional Application No. 61/277,758, filed Sep. 29, 2009.

TECHNICAL FIELD

This invention relates generally to a biomass conveying system for use with a harvester, operable for receiving a mixed flow of heavier or denser biomass or residue, and lighter airborne biomass residue, which more particularly incorporates residue distributing apparatus configured and operable for separating the lighter airborne residue from the heavier biomass as it is conveyed from the harvester, and distributing the airborne residue over a field.

BACKGROUND ART

U.S. Provisional Application No. 61/277,758, filed Sep. 29, 2009, is incorporated herein by reference in its entirety.

With the demand for energy contained in biomass, demand for equipment to harvest the biomass has increased dramatically. This has thus created a need for modifications to equipment that has existed in the marketplace, as well as for completely new equipment. Some of the challenges that must be overcome include the loading, moving, transporting and refining the harvested biomass. Additionally, in some instances, it may be desired that some of the biomass created in a harvesting operation be returned to the field. This can be for any of a number of reasons, including, but not limited to, to prevent erosion, to break down and return nutrients to the field, and because those aspects of the biomass are insufficiently valuable to justify costs of collection, storage and/or transportation to a user. Particularly with regard to corn, such unwanted biomass can include shucks or husks that wrap about the corn ears, leaf trash from the corn stalks, as well as the stalks themselves. In contrast, the corn cobs and fodder associated with the cobs is considered valuable, both as animal feed, and as sources of oil and fuel.

As an example, presently there is an increased demand for cobs as a feedstock for cellulosic ethanol. As a result, there is heightened interest in collecting corn cobs during corn harvest. There is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect mostly just the cobs, that is, with substantially all loose or detached residual elements of the residue, which are lighter than the cobs, mainly, husks and leaves and fragments thereof, returned to the field.

Thus, it is sought to have a biomass conveyor system adapted for operation in connection with a harvester, and optionally a collection device for the heavier or denser more valuable biomass to be gathered, which incorporates an ability to separate or remove other lighter crop residue or stover, and return the other lighter residue to the field in a distributed manner.

Numerous apparatus have been proposed for use in connection with biomass conveying devices, particularly for cobs, for cleaning or separating other stover and crop residue from the cobs and distributing or spreading it. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which use a threshing and separating system to separate and collect the corn kernels, and discharge the cobs and other stover onto the field.

Combines which harvest the corn and separate the kernels from the cobs and other stover or residue, then discharge the cobs and other stover onto the field, are now the industry standard. More recently, devices for collecting cobs discharged from combines have been developed. Several of such known devices have variously utilized a towed cart or wagon for receiving and holding the cobs, and a conveyor system for conveying the cobs from the combine to the cart or wagon. Some of the cob collection devices also include apparatus for separating the cobs from the lighter other stover or residue downstream or remotely from the combine, mainly using air flow. Reference in this regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the lighter stover from the cobs as they are released from the top of the second conveyor and to blow the stover back onto the field. Redekop et al. U.S. Patent Publication Nos. 20090095662 published Apr. 16, 2009; 20090104952 published Apr. 23, 2009; and 20090124309 published May 14, 2009, disclose a pulled cob collection unit, which utilizes a sequential series of inclined belt conveyors, and blower or suction fans disposed remotely from the combine for directing air through the discharged material as it falls from the upper end of one conveyor onto a lower end of the next conveyor, such that the heavier cobs are to continue to the next conveyor and the lighter stover or residue will be carried away by the air flow, with the cobs being conveyed into a collection tank by a further conveyor or conveyors.

An observed shortcoming of the above referenced known cob conveyor and distributing systems, is a lack of utilization of available air flow discharged from the cleaning system of a harvester, which air flow can be quite voluminous and powerful, even after it has left the harvester.

Thus, what is sought is a biomass conveying and distributing system for use in association with a harvester such as a combine, which provides one or more of the capabilities set forth above, namely, effective separating and distributing of lighter other crop residue from the wanted heavier or denser biomass, e.g., cobs, utilizing available apparatus and capabilities found on a harvester, namely, air flow from the cleaning system of the harvester, while minimizing shortcomings of known devices and systems, namely, increased apparatus, weight, complexity and power demand of a trailer towed by the harvester.

SUMMARY OF THE INVENTION

What is disclosed is what is a biomass conveying and residue distributing system for use in association with a harvester such as a combine, which provides one or more of the capabilities set forth above, namely, effective separating and distributing of lighter other crop residue from the wanted heavier or denser biomass to be collected, utilizing available apparatus and capabilities found on a harvester, namely, air flow from the cleaning system of the harvester, while minimizing shortcomings of known devices and systems, namely, increased apparatus, weight, complexity and power demand of a trailer towed by the harvester.

According to a preferred aspect of the invention, the harvester is operable for discharging a flow of heavier or denser biomass (hereinafter sometimes referred to as just heavier biomass) mixed with an airborne flow of lighter biomass residue. The system of the invention includes a conveyor disposed adjacent to a discharge outlet of the harvester, configured and operable for receiving and conveying the flow of heavier or denser biomass, e.g., cobs, from the harvester and conveying the received heavier biomass away from the harvester. The system includes a residue distributing apparatus disposed above the conveyor in a path of at least a portion of the airborne flow of lighter residue, including at least one deflector configured and operable for redirecting the airborne flow sidewardly away from the conveyor, above a passage through which the conveyor passes for carrying the heavier biomass away from the harvester.

As an advantage of the system of the invention, the air flow, which preferably originates from the cleaning system or other systems of the harvester, is utilized in the residue separating and distributing function of the invention, so as to use existing energy, which would otherwise be wasted, for this purpose.

As another preferred aspect of the invention, the at least one deflector includes a sidewardly facing center surface portion extending rearwardly and transitioning to a more forwardly facing surface portion which extends sidewardly away from the center surface portion. As another preferred aspect, the system uses two of the deflectors, extending rearwardly and in opposite sideward directions, respectively, from a central splitter disposed above a center region of the conveyor.

As another preferred aspect of the invention, the at least one deflector of the system is disposed above and integrates with a cover over the conveyor in a manner for splitting the airborne flow from the flow of heavier biomass conveyed on the conveyor.

As another preferred aspect of the invention, the at least one deflector is configured and operable for deflecting the airborne flow upwardly and sidewardly away from the conveyor.

And, according still another preferred aspect of the invention, a residue spreader of conventional or new design can be disposed over the conveyor forwardly of the at least one deflector. If not operated, the spreader will provide partial enclosure of the path of air flow A and residue flow BC, for containing and directing those flows rearwardly toward the residue distributing apparatus of the invention. If operated, the spreader will induct at least a portion of the airborne flow from the flow of heavier biomass and spread the inducted airborne flow over a field. The residue that escapes rearwardly from the spreader may have substantial volume and velocity and may carry at least some residue, and the at least one deflector of the residue distributing apparatus is positioned and operable for using that air flow for distributing that residue, along with air flow A and airborne residue BC that bypasses the spreader.

DETAILED DESCRIPTION OF THE INVENTION

Figure 1:
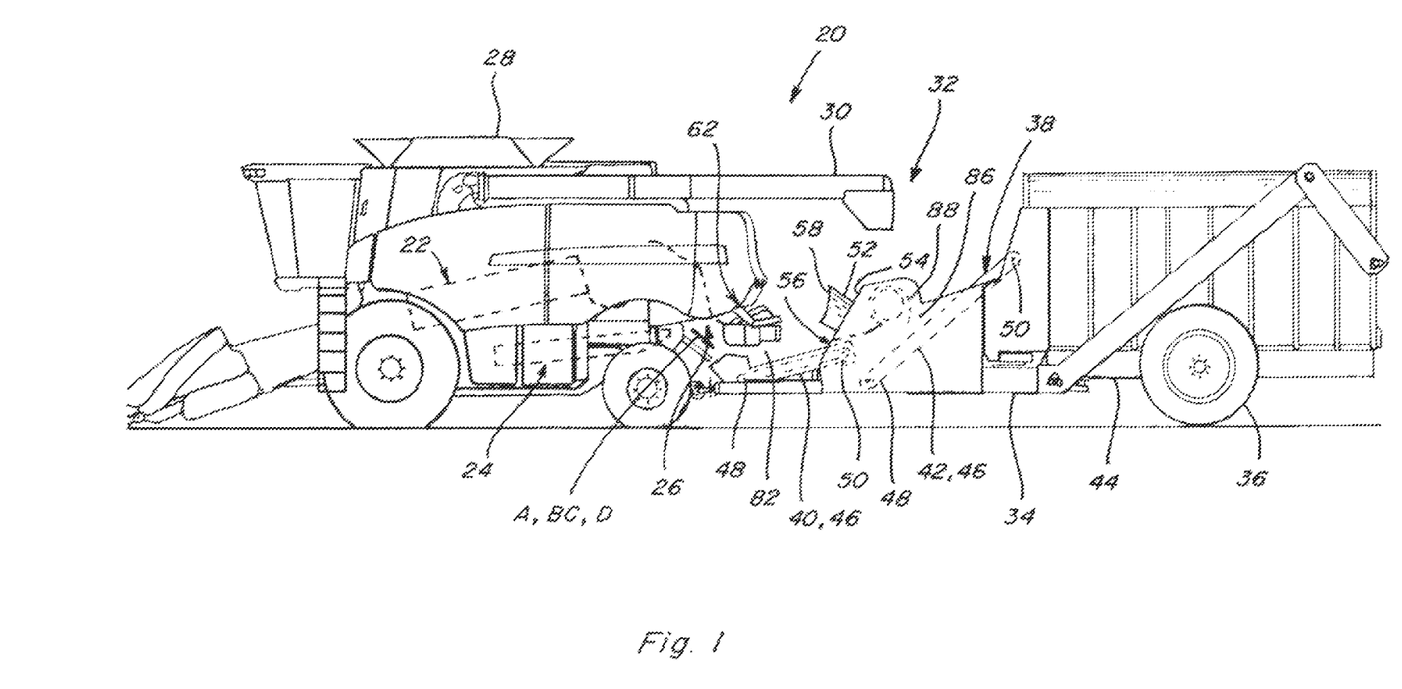
FIG. 1 is a fragmentary side view of a representative agricultural harvester, including a biomass conveying and residue distributing system according to the invention.
Figure 2:
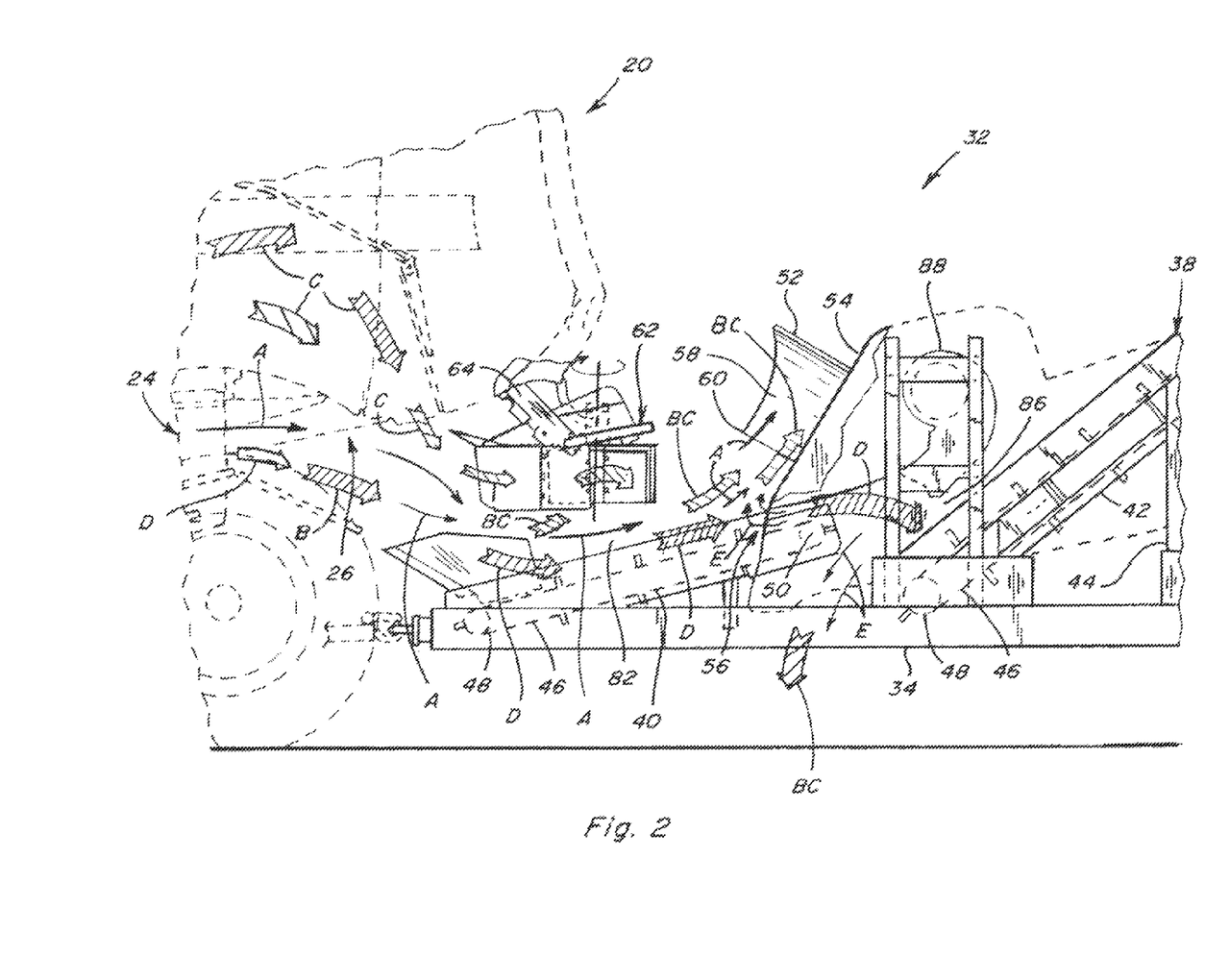
FIG. 2 is an enlarged fragmentary side view of the harvester and biomass conveying and distributing system of FIG. 1, illustrating aspects of operation of the system.
Figure 3:
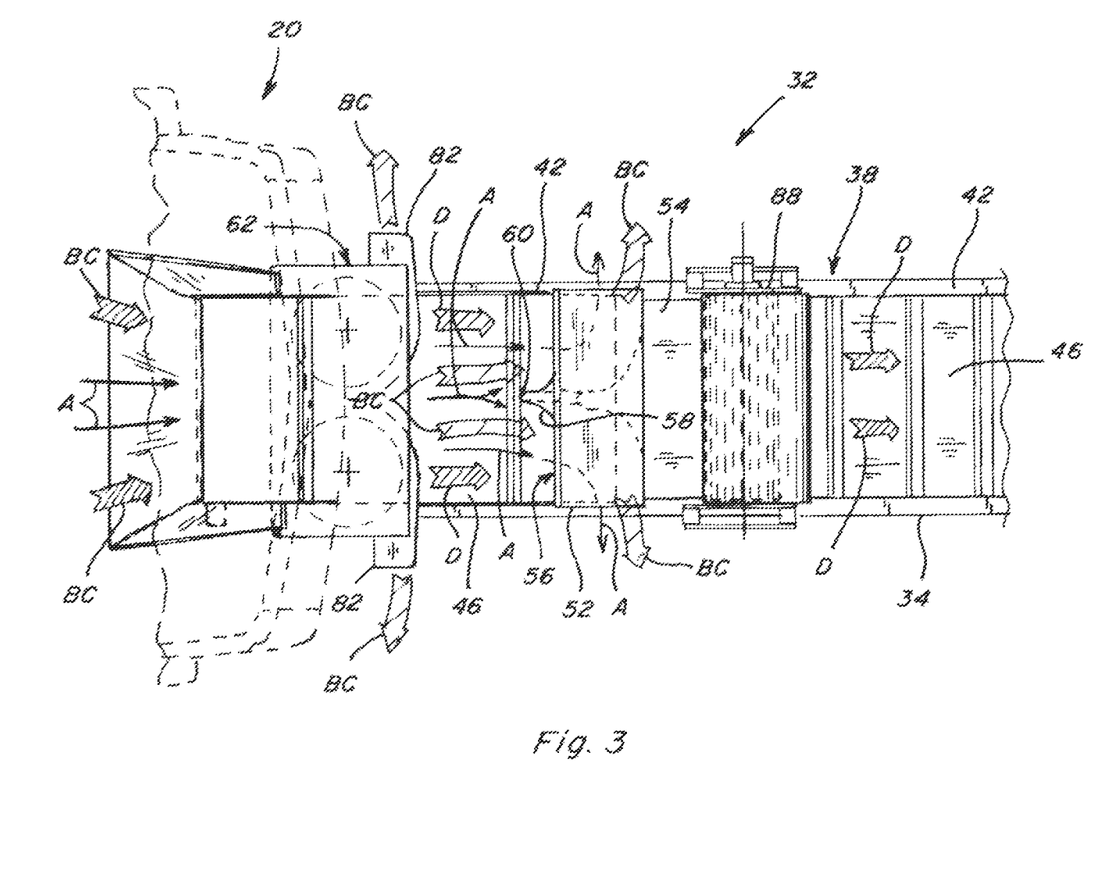
FIG. 3 is a fragmentary top view of the harvester and biomass conveying and distributing system of FIG. 1, illustrating aspects of operation of the system.

Referring now the drawings, in FIGS. 1, 2 and 3, a representative agricultural harvesting machine 20 is shown, which is a combine constructed and operable in the well known manner for harvesting grain, here, configured for whole ears of corn from corn plants as the combine travels over a field. Machine 20 includes well known apparatus that gathers and conveys the ears of corn into a threshing system 22 within the combine which removes most of the husk surrounding the ears, and the corn kernels from cobs of the ears, and directs a flow of the corn, and biomass, here including some of the cobs and fragments thereof, and other residue or stover lighter than the corn and cobs, such as fragments of husks, leaves, dust, and the like, within a rear chamber of combine 20 to a cleaning system 24 of the combine. At the same time, cleaning system 24 has a fan that generates a powerful, voluminous upward and rearward flow of air, denoted by arrows A, utilized to separate and carry away in an airborne manner the lighter elements of biomass, and continue to carry these lighter elements rearwardly through the internal space above system 24 to a rear discharge outlet 26, as denoted by arrows B. Also at the same time, larger residue other than corn kernels, such as loose husks, leaves and the like, which are typically of a paper like consistency and are relatively light, as well as dust, and a large amount of cobs and cob fragments, are propelled from threshing system 22 rearwardly within the end of machine 20, as a flow denoted by arrows C, and is deflected downwardly toward discharge outlet 26 on the rear end of machine 20, so as to mix with flow B in the rear confines of machine 20.

Cleaning system 24 of combine 20 is operable in the conventional manner to separate the cobs and other larger elements of biomass from the smaller kernels of corn and smaller elements of biomass residue, and the corn is collected and conveyed into a clean grain tank 28 on combine 20, or other receiver. At the same time, lighter elements of the residue mixed with the kernels, cobs and cob fragments will be released, so as to be carried rearwardly by air flow A, and such that the heavier cobs and cob fragments will travel rearwardly along the upper surfaces of the cleanings system toward outlet 26. The clean corn is then periodically unloaded from tank 28 using an unloader conveyor 30 in the conventional manner, by swinging conveyor 30 to a sidewardly extending position (not shown—conveyor 30 being illustrated in a stowed or travel position here). The mixture of flows B and C, denoted by arrows BC, as well as the flow D mostly of cobs and cob fragments, is discharged from machine 20 downwardly and rearwardly through discharge outlet 26.

Machine 20 is shown including a biomass conveying and residue distributing system 32, constructed and operable according to the teachings of the present invention, for receiving the flows of biomass, here including husks, leaves, cobs and other elements of corn residue or stover denoted variously by arrows BC and D, and discharging and distributing the airborne flow of lighter residue BC over the field, while conveying the flow of heavier biomass, mainly clean cobs as denoted by arrows D, away. Here, system 32 utilizes a trailer 34 suitably supported on wheels 36, or tracks (not shown) and configured for towing by machine 20, for carrying aspects of system 32, including a conveyor system 38.

Conveyor system 38 of system 32 here includes a first inclined conveyor 40 and a second inclined conveyor 42, extending to a cob collection device 44 also carried on the trailer, although it should be understood that the present invention can comprise any number of conveyors, and may or may not include a collection device. Conveyors 40 and 42 are depicted here as belt type conveyors, each of which includes an endless belt 46 which extends about a roller 48 at the lower end, and which is driven by a drive roller 50 at the upper end, which can be powered by a suitable drive, such as, but not limited to, a fluid or electric motor, belt, chain or the like, for moving the upper surface of the belt rearwardly carrying cobs D and any other residue thereon toward collection device 44, in the well known manner.

A front end of first conveyor 40 is disposed directly beneath discharge outlet 26 in the path of flows A, BC and D. Flow D from the cleaning system, which will be mostly cobs, will fall directly onto belt 46. Flow BC will be turbulent and mixed with air flow A, and will be powerful, such that many of the cobs of that flow will be initially airborne, but, because of their mass, will settle down onto belt 46. Much of the more powerful air flow, however, will tend to be deflected and guided rearwardly and upwardly along belt 46, essentially over the cob flow D conveyed thereby. Thus, as the flows A, BC and D travel rearwardly and upwardly along conveyor 40, they will tend to laminate somewhat, with an air flow containing airborne lighter residue traveling over the cobs on conveyor 40. This effect will be dependent somewhat on factors such as the air flow output of the cleaning system fan, residue quantity, composition, and moisture content thereof, flow restrictions, obstructions, and the like, but, in any event, the carrying air flow A should be sufficient in both quantity and velocity for carrying a substantial portion of the lighter residue well past the end of first conveyor 40 for the purposes of the invention.

Figure 4:
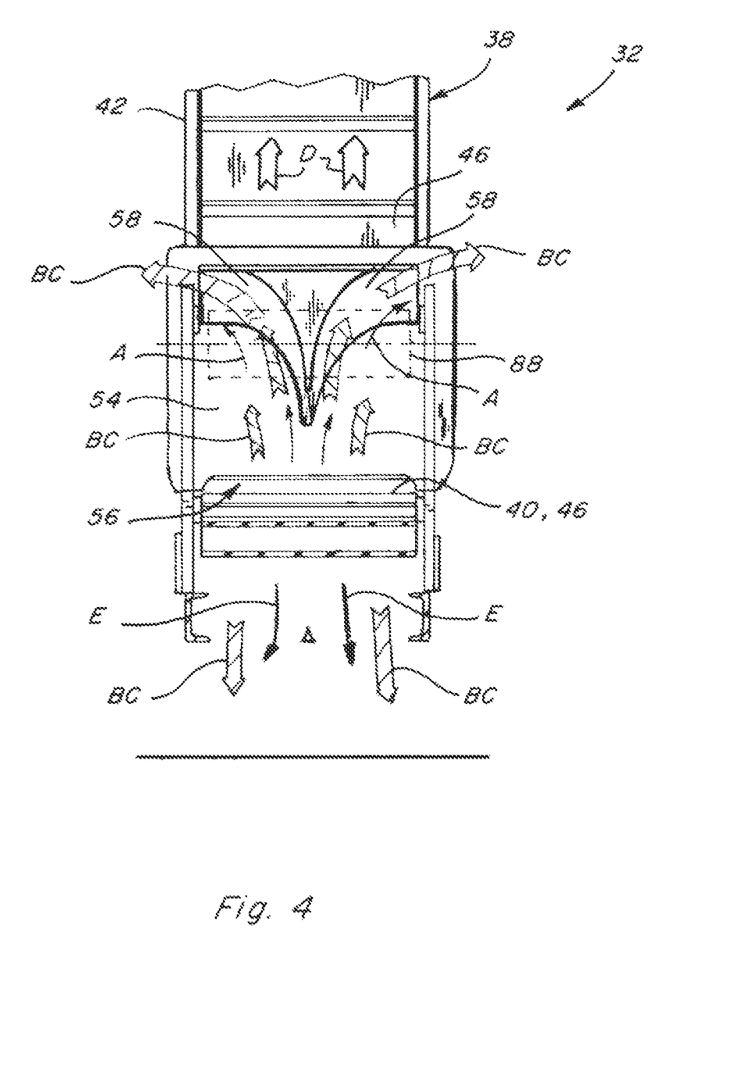
FIG. 4 is a front sectional view of the system of FIG. 1, illustrating operational aspects.

Referring also FIG. 4, further in the above regard, system 32 of the invention includes a residue distributing apparatus 52 disposed outwardly and rearwardly of machine 20, here, located on a cover 54 enclosing the rear end of first conveyor 40. This positions apparatus 52 directly in a path of at least a portion of air flow A carrying airborne flow BC, and above a forwardly facing inlet opening 56 of cover 54, through which the heavier biomass (flow D) will be conveyed by conveyor 40 en route to second conveyor 42. Apparatus 52 includes a pair of deflectors 58 of sheet metal plastics or other suitable, rigid construction, in essentially a whale tail shape extending upwardly and rearwardly from a splitter 60 disposed over a central region of conveyor surface 46 of conveyor 40, and curving sidewardly in opposite directions, so as to guide or redirect the air flow A and airborne flow BC upwardly and sidewardly away from conveyor 40. The sectional shape of surfaces of deflectors 58 when viewed endwise can be flat, curved, angled, or a combination shape, as desired or required for a particular application. The split air flows A should be sufficient for carrying or propelling the residue a desired sideward distance from trailer 34, and then dissipate, such that the residue will then fall to the ground below. At the same time, cover 54 defines and encloses a passage above conveyor 40 through which the heavier biomass or cobs will be conveyed by conveyor 40. As a result, the lighter airborne residue is separated from the heavier biomass, e.g. cobs, and distributed or spread over a field, while the heavier biomass is conveyed to a desired destination, which here is collection device 44.

Here, it can be observed that the forwardly facing surface of cover 54 on which the distributing apparatus 52 is disposed is inclined at a substantially steeper angle compared to the angle of inclination of conveyor 40. This is advantageous, as it utilizes a portion of the remaining energy of air flow A to elevate residue flow BC sufficiently for achieving an acceptable widespread distribution of the residue over a field. However, it should be noted that the distribution achieved, like the air flow discharged from machine 20, will be a function of numerous factors, including cleaning system fan speed and other settings, residue volume, density, moisture content and the like, as well as obstructions, restrictions, environmental conditions such as wind speed, direction, and the like.

Figure 5:
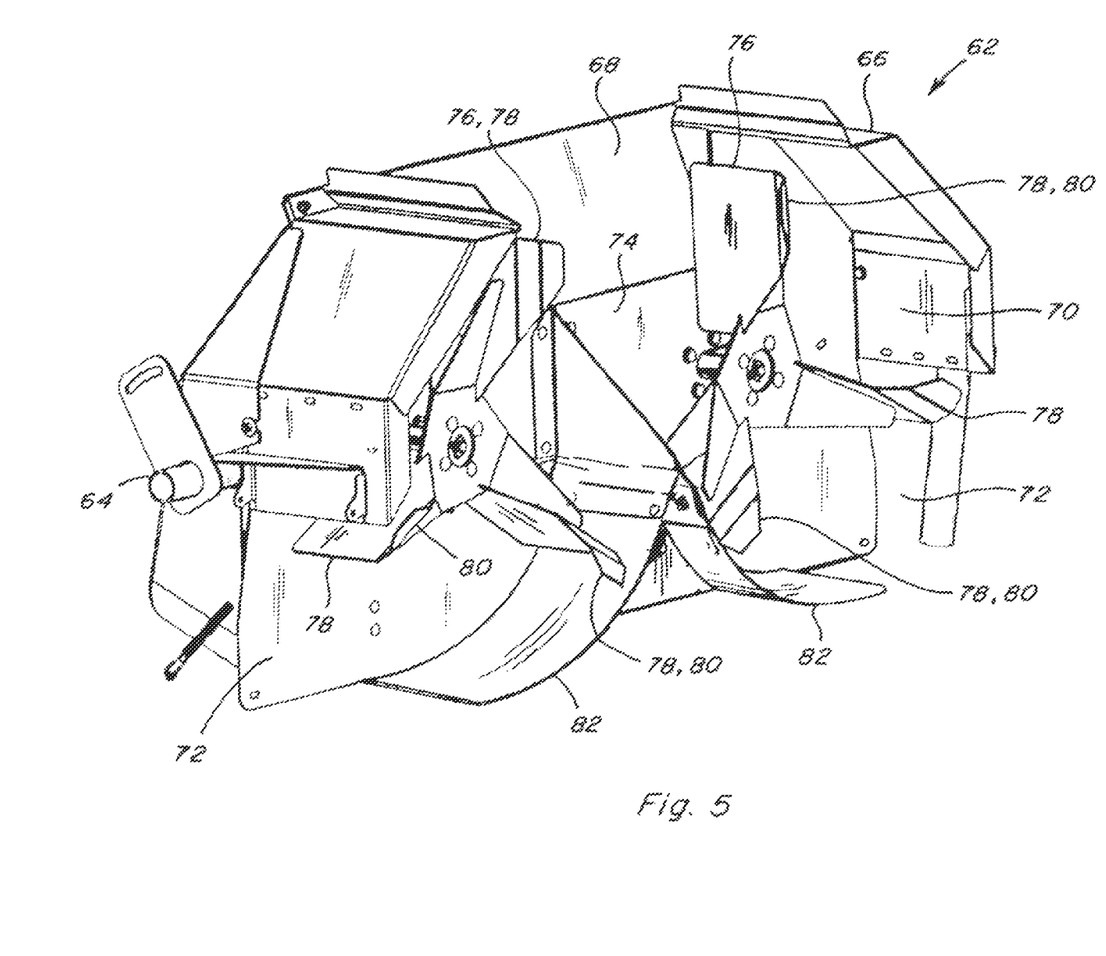
FIG. 5 is a perspective view of optional residue spreader apparatus for the system of the invention.
Figure 6:
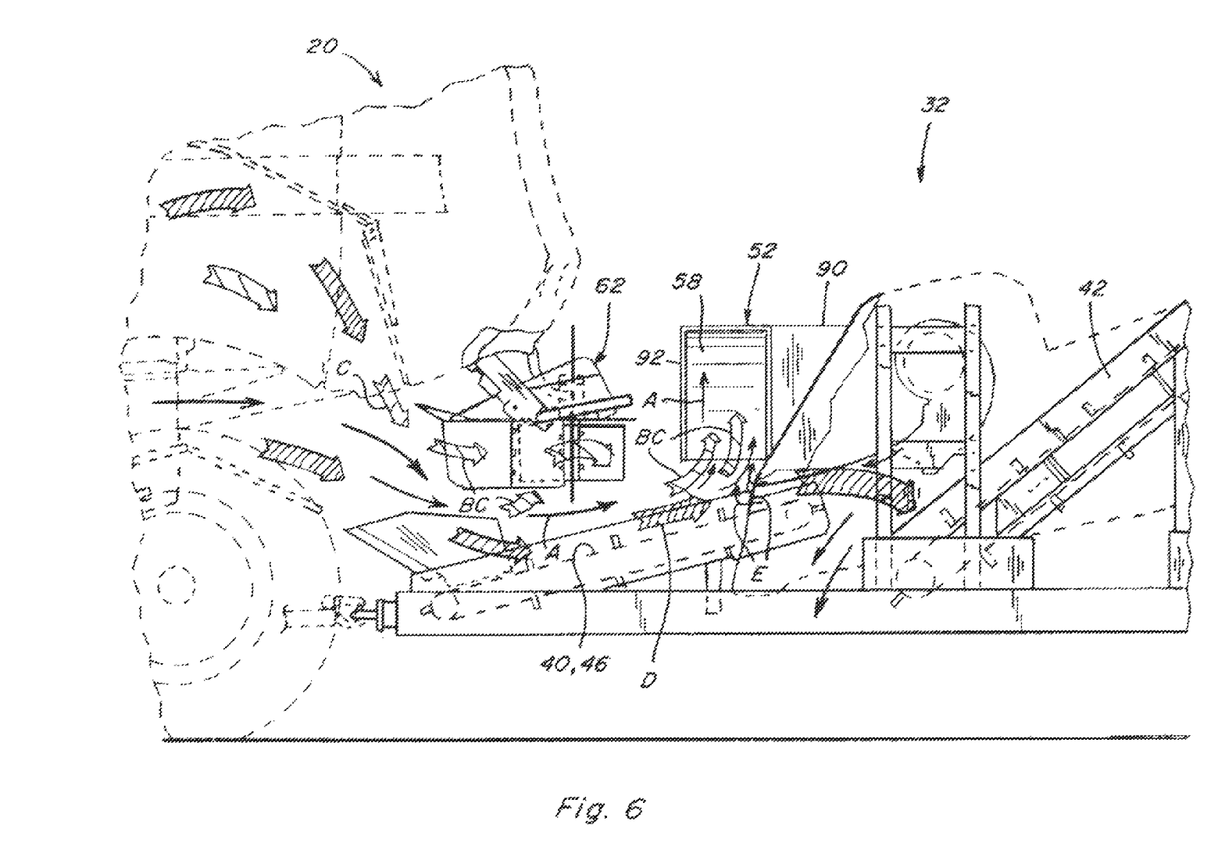
FIG. 6 is an enlarged fragmentary side view of the harvester and another embodiment of a biomass conveying and distributing system of the invention, illustrating operation of the system.
Figure 7:
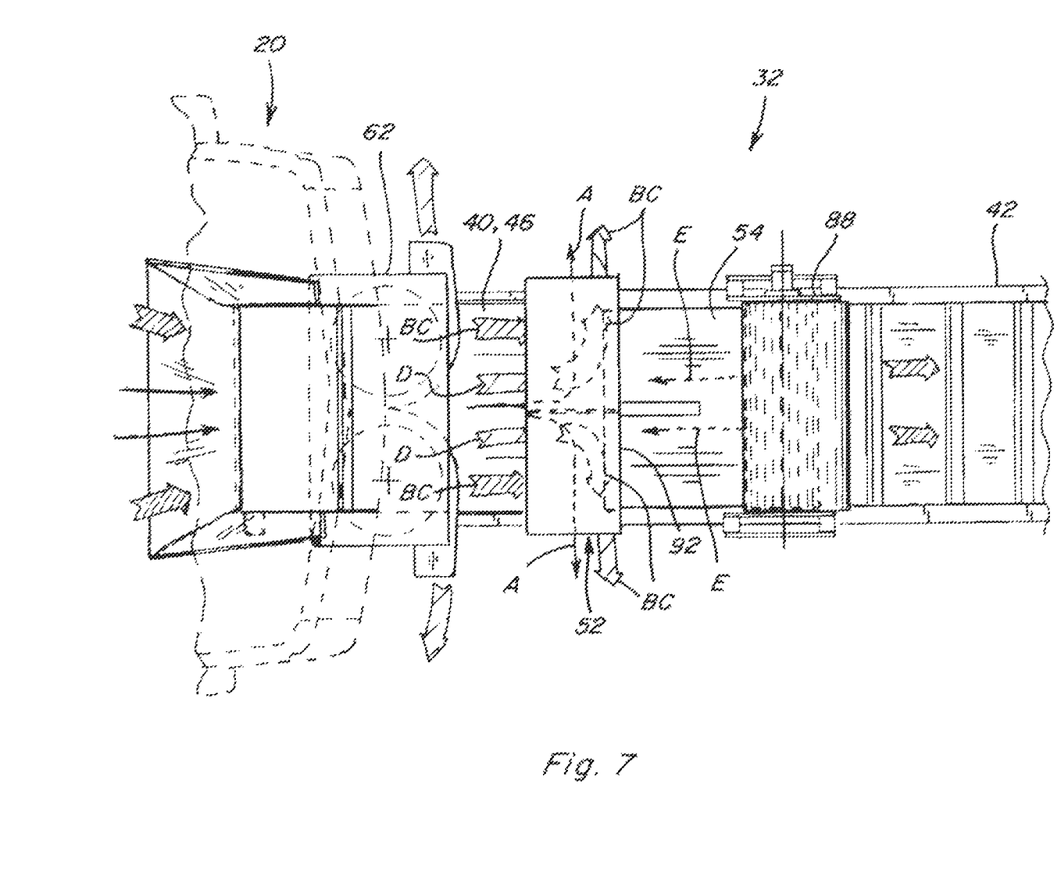
FIG. 7 is a fragmentary top view of the harvester and biomass conveying and distributing system of FIG. 6, illustrating operation of the system.
Figure 8:
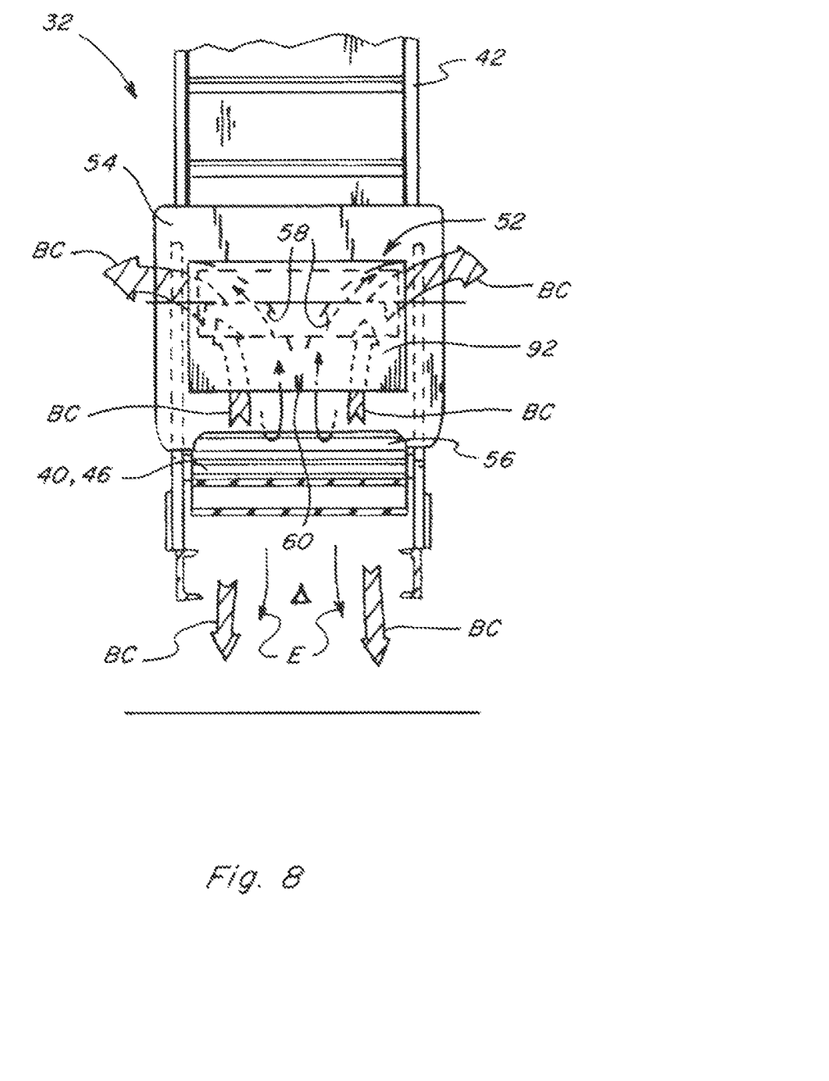
FIG. 8 is a front sectional view of the system of FIG. 6, illustrating operational aspects.

Referring also to FIG. 5, as an option feature of the invention, a residue spreading apparatus 62 is disposed over conveyor 40 forwardly of residue distributing apparatus 52. Spreading apparatus 62 is configured for containing and guiding at least a portion of the airborne flow as it travels rearwardly over conveyor 40. Apparatus 62 is also operable for inducting all or a portion of the lighter residue from the flow of cobs or other heavier biomass and spreading the inducted flow over a field. Here, apparatus 62 is supported by machine 20 so as to be movable through a range of operating positions, including a generally horizontal position as shown, a generally vertical position, and a range of intermediate or tilted positions between horizontal and vertical (not shown). This can be accomplished using any suitable support apparatus for connecting apparatus 62 to machine 20, such as, but not limited to, pivoting support brackets 64 (FIGS. 2 and 5) on opposite sides of apparatus 62, with locking or detent elements, clamps, etc., for holding the apparatus at a desired position.

Residue spreading apparatus 62 includes a housing 66 of sheet metal or other suitable construction, defining a first inlet opening 68, a second inlet opening 70 about perpendicular to first opening 68, and a pair of sidewardly facing discharge openings 72, all connecting with an interior cavity 74. Housing 66 contains a side by side pair of impellers 76, mounted on drive shafts for counter rotation toward the respective discharge openings 72, as denoted by arrows R1 and R2, by suitable drives such as conventional fluid or electric motors, belts, or the like. Impellers 76 each include blades 78 preferably configured and operable during the rotation of the impellers for generating a low or negative pressure condition in and about openings 68 and 70, sufficient for inducting air and airborne material through those openings, then carrying the material through cavity 74 and discharging it through discharge openings 72.

The inductive capability of impellers 76 is achieved via the shapes of blades 78, which have outer edge portions 80 adjacent to openings 68 and 70, configured so as to have a positive angle of attack (extending in the direction of rotation R1 or R2) for creating the low or negative pressure condition in and about the inlet openings, operable for drawing or inducting air and airborne material through the openings for the purposes of the invention. A more complete description of suitable impellers 76 is disclosed in Schmidt, et al. U.S. Pat. No. 6,983,340, issued May 17, 2005, entitled ROTARY ACCELERATING APPARATUS FOR A VERTICAL STRAW AND CHAFF SPREADER OF AN AGRICULTURAL COMBINE, which patent is hereby incorporated herein by reference in its entirety.

Residue spreading apparatus 62 is shown in a generally horizontal position, generally above the forward end of first conveyor 40, such that first inlet opening 68 faces generally forwardly and bounds and defines a rear periphery of discharge outlet 26, while second inlet opening 70 faces downwardly, and is spaced above the upper surface of first conveyor 40. First inlet opening 68 will be directly in the path of a portion of air flow A and airborne residue flow BC, while second inlet opening 70 will not be directly in any of the residue flows, but instead faces downwardly toward first conveyor 40 so as to be above the flow onto and conveyed by that conveyor. However, the low or negative pressure condition generated by the rotation of impellers 76, in combination with the air of flow A, which is voluminous (several hundred cubic feet per minute or more) and typically powerful, will be sufficient to induct at least some of the lighter elements of residue of flow BC into first inlet opening 68, as denoted variously by arrows BC, but not the heavier cobs as a result of their greater momentum due to their mass which keeps them on a downward path.

At the same time, the low or negative pressure condition present in downwardly facing inlet opening 70, in combination with the air of flow A, which again will be voluminous and still powerful, will operate to lift and induct the lighter elements of residue upwardly into apparatus 62, as again denoted by arrows BC, but not the cobs, again because of their greater mass. In both instances, the air flow A will facilitate this by acting to break up and reduce the density of the cobs as it passes therethrough, to facilitate separation of the lighter elements and induction thereof into spreading apparatus 62. The flow BC will also tend to be agitated somewhat, including being deflected upwardly, by the movement of belt 46 of conveyor 40, which is preferably slatted, which will facilitate the induction of the lighter elements of residue. Further, it can be observed that conveyor 40 is tilted upwardly toward the rear, so as to extend generally convergingly in that direction with spreader apparatus 62, such that an area 82 between conveyor 40 and apparatus 62 will be progressively smaller toward the rear. This also facilitates the entry and directing of the air flow A and lighter residue elements toward inlet opening 70 of the spreading apparatus.

Still further in this regard, a partial enclosure, for instance, of sheet metal or a flexible curtain, can optionally extend about a portion of discharge outlet 26 and the region between apparatus 62 and conveyor 40, to reduce the amount of air that can escape to the side.

Once inducted into apparatus 62, the lighter residue and air will be propelled sidewardly therefrom through discharge openings 72 by impellers 76, as denoted by arrows BC. Appropriate deflectors 84 about openings 72 can be utilized for controlling this flow, in the well known manner. As a result, using spreader apparatus 62 in combination with distributing apparatus 52 provides a sequential, two-step residue separation and distributing/spreading capability, such that a substantial amount, if not virtually all, lighter biomass will be removed from the heavier biomass.

Additionally, a second or third residue separating capability can be incorporated into conveyor system 38. As an example, it can be observed that the rear or downstream end of conveyor 40 is spaced above the forward end of second conveyor 42, such that the biomass conveyed by conveyor 40 will fall through a gap 86 onto conveyor 42. A fan 86 is supported on trailer 34 just above gap 86, and is configured and operable for directing a flow of air downwardly therethrough, as denoted by arrow E. In operation, the biomass falling through gap 86 will tend to break up and separate at least somewhat allowing air flow E to flow therethrough for removing remaining lighter elements of biomass. In this regard, the velocity and force of air flow E will be set sufficiently low such that the heavier elements of the biomass, e.g., cobs, will not be diverted from their downward trajectory on to second conveyor 42. The lower end of gap 86 is open to allow discharge of the lighter residue onto the ground below trailer 34. The thus cleaned cobs will then be conveyed by conveyor 42 upwardly and into cob collection device 44. It can be observed also in FIG. 2, that some of air flow E can flow downwardly and forwardly along conveyor 40, so as to exit through inlet opening 56 and travel upwardly along surface 54 to distributing apparatus 52. This can be advantageous to maintain opening 56 clear of obstructions and the like.

Thus, if required, the present invention enables use of up to three modes of residue separation and distribution, namely: residue distributing apparatus 52; residue spreading apparatus 62; and/or fan 88, as desired or required for a particular harvesting operation.

Referring also to FIGS. 6, 7 and 8, residue distributing apparatus 52 of system 32 of the invention is shown in an alternative orientation, namely, with deflectors 58 thereof oriented to extend vertically as opposed to at an incline. To achieve this orientation, a wedge-shaped spacer 90 is shown mounted on inclined cover 54 to support deflectors in the upright orientation. Additionally, the front end of apparatus 52 is covered by a front cover 92. As a result, apparatus 52 overhangs a portion of surface 46 of conveyor 40, in the manner of a hood, and is closer in the forward direction to optional spreader apparatus 62 if used, to act to better trap and contain the flows A, BC and possibly flow E from fan 88, for improved residue distribution, particularly when some windy conditions, such as cross winds, are present. Otherwise, the other operational aspects of machine 20 will be the same, and flow of cobs D will be conveyed beneath apparatus 52 to conveyor 42 and be conveyed on in the above described manner.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A biomass conveying and distributing system for a harvester operable for discharging a flow of heavier or denser biomass mixed with an airborne flow of residue lighter than the heavier biomass, comprising:

a conveyor disposed adjacent to a discharge outlet of the harvester, the conveyor receives and conveys the flow of heavier or denser biomass from the harvester and conveys the received biomass away from the harvester;

residue distributing apparatus disposed above the conveyor in a path of at least a portion of the airborne flow, including at least one deflector that redirects the airborne flow sidewardly and away from the conveyor while defining a passage above the conveyor through which the heavier or denser biomass will be conveyed away by the conveyor on to a further conveyor;

a fan disposed rearwardly of the residue distributing apparatus, the fan directs a second flow of air forwardly and down along the conveyor; and an additional fan that generates an additional airflow, the additional airflow is opposite the second airflow, the additional fan positioned above a gap that is located between the conveyor and the further conveyor, the additional air flow set as not to substantially divert flow of cobs in the biomass from the conveyor to the further conveyor.

2. The system of claim 1, wherein the at least one deflector includes a sidewardly facing center surface portion extending rearwardly and transitioning to a more forwardly facing surface portion which extends sidewardly away from the center surface portion.

3. The system of claim 2, comprising two of the deflectors, extending rearwardly and in opposite sideward directions, respectively, from a central splitter disposed above a center region of the conveyor.

4. The system of claim 2, wherein the deflector is disposed above and is integrated with a cover over a portion of the conveyor in a manner for splitting the airborne flow from the flow of heavier or denser.

5. The system of claim 1, wherein the at least one deflector is configured and operable for deflecting the airborne flow upwardly and sidewardly away from the conveyor.

6. The system of claim 1, further comprising a residue spreading apparatus disposed over the conveyor forwardly of the at least one deflector for containing the airborne flow, configured and operable for inducting at least a portion of the airborne flow from the flow of heavier or denser biomass and spreading the inducted airborne flow over a field, and wherein the at least one deflector is positioned and operable for deflecting portions of the airborne flow which bypass or escape from the residue spreading apparatus.

7. The system of claim 1, wherein the fan disposed rearwardly of the residue distributing apparatus is operable for directing a second flow of air forwardly and down along the conveyor for removing at least some of any remaining residue lighter than the heavier or denser biomass from the biomass, and wherein the at least one deflector is configured for receiving at least a portion of the second flow of air and deflecting it sidewardly from the conveyor.

8. A conveying and residue distributing system for a harvester operable for discharging a flow of cobs mixed with an airborne flow of residue lighter than the cobs, comprising:
 a conveyor disposed adjacent to a discharge outlet of the harvester, the conveyor receives and conveys the flow of cobs from the outlet;
 residue distributing apparatus including a cover at least partially enclosing the conveyor and defining a passage that separates the airborne flow from the cobs, and at least one deflector that redirects the airborne flow sidewardly and away from the apparatus;
 a fan disposed rearwardly of the residue distributing apparatus, the fan directs a second flow of air forwardly and down along the conveyor to a further conveyor; and
 another fan that generates an additional airflow, the additional airflow is opposite the second flow of air, the another fan positioned above a gap that conveys cobs in the biomass from the conveyor to the further conveyor, the resulting air flow set as not to substantially divert flow of the cobs from the conveyor to the further conveyor.

9. The system of claim 8, wherein the distributing apparatus includes a splitter disposed and operable for splitting the airborne flow into two airborne flows, and the at least one deflector is represented by two deflectors extending rearwardly from the splitter, configured and operable for redirecting the two airborne flows in opposite sideward directions, respectively.

10. The system of claim 8, comprising a trailer carrying the conveyor and the residue distributing apparatus, along with a cob collection device for receiving the cobs from the conveyor and holding the cobs.

11. The system of claim 8, further comprising a powered residue spreading apparatus disposed over the conveyor forwardly of the distributing apparatus, configured and operable for inducting at least a portion of the airborne flow from the flow of cobs and spreading the inducted airborne flow over a field, and wherein the at least one deflector is positioned and operable for deflecting and distributing portions of the air flow which escape from or pass the spreader.

12. A biomass conveying and distributing system for a harvester operable for discharging a flow of heavier or denser biomass mixed with an airborne flow of residue lighter than the biomass, comprising:
 a trailer attachable in towed relation to the harvester and carrying a conveyor system that receives the flow of heavier or denser biomass and the airborne flow when the trailer is attached to the harvester, the conveyor system conveys the flow of heavier or denser biomass rearwardly from the harvester;
 residue distributing apparatus disposed on the trailer above a portion of the conveyor system in a path of the airborne flow, including at least one deflector that redirects the airborne flow sidewardly away from the conveyor while allowing the heavier or denser biomass to settle on and be conveyed away by the conveyor;
 a fan disposed rearwardly of the residue distributing apparatus, the fan directs a second flow of air forwardly and down along the conveyor, and;
 an extra fan that generates an additional airflow; the additional airflow is opposite the second flow of air, the extra fan positioned above a gap that is between the conveyor and a further conveyor, the additional air flow set as not to substantially divert flow of cobs in the biomass from to the conveyor to the further conveyor.

13. The system of claim 12, wherein the at least one deflector includes a sidewardly facing surface portion extending rearwardly and transitioning to a more forwardly facing surface portion which extends sidewardly away from a center region of the conveyor system.

14. The system of claim 13, comprising two of the deflectors, extending rearwardly and in opposite sideward directions, respectively, from a central splitter disposed above a forward end of the conveyor system configured and operable for splitting the airborne flow into two flows, and the deflectors being operable directing the two flows sidewardly and outwardly from the trailer in opposite directions.

15. The system of claim 12, wherein the at least one deflector comprises an enclosure at least partially covering the conveyor system and configured for splitting the airborne flow from the heavier or denser biomass.

16. The system of claim 12, wherein the at least one deflector is configured and operable for deflecting the airborne flow upwardly and sidewardly away from the conveyor system.

17. The system of claim 12, further comprising a residue spreading apparatus disposed over a region of the conveyor system forwardly of the at least one deflector and operable for containing at least a portion of the airborne flow over the conveyor, the spreading apparatus being configured and operable for inducting at least a portion of the airborne flow from the flow of heavier or denser biomass and spreading the inducted airborne flow over a field, and wherein the at least one deflector is positioned and operable for deflecting and distributing portions of the airborne flow that bypass or escape from the spreading apparatus.

18. The system of claim 12, wherein the fan disposed rearwardly of the residue distributing apparatus is operable for directing a second flow of air forwardly and down along the conveyor for removing at least some of any remaining residue from the heavier or denser biomass, and wherein the at least one deflector is configured for receiving at least a portion of the second flow of air and deflecting it sidewardly from the conveyor.

19. The system of claim 12, wherein the heavier or denser biomass comprises corn cobs.

* * * * *